No. 728,860. PATENTED MAY 26, 1903.
C. CAMPUS.
MOTOR.
APPLICATION FILED OCT. 15, 1902.
NO MODEL. 6 SHEETS—SHEET 2.

No. 728,860. PATENTED MAY 26, 1903.
C. CAMPUS.
MOTOR.
APPLICATION FILED OCT. 15, 1902.
NO MODEL. 6 SHEETS—SHEET 4.

Witnesses
J. Staib
Chas. H. Smith

Inventor
Cesare Campus
Attorneys L. W. Serrell & Son

No. 728,860. PATENTED MAY 26, 1903.
C. CAMPUS.
MOTOR.
APPLICATION FILED OCT. 15, 1902.
NO MODEL. 6 SHEETS—SHEET 5.
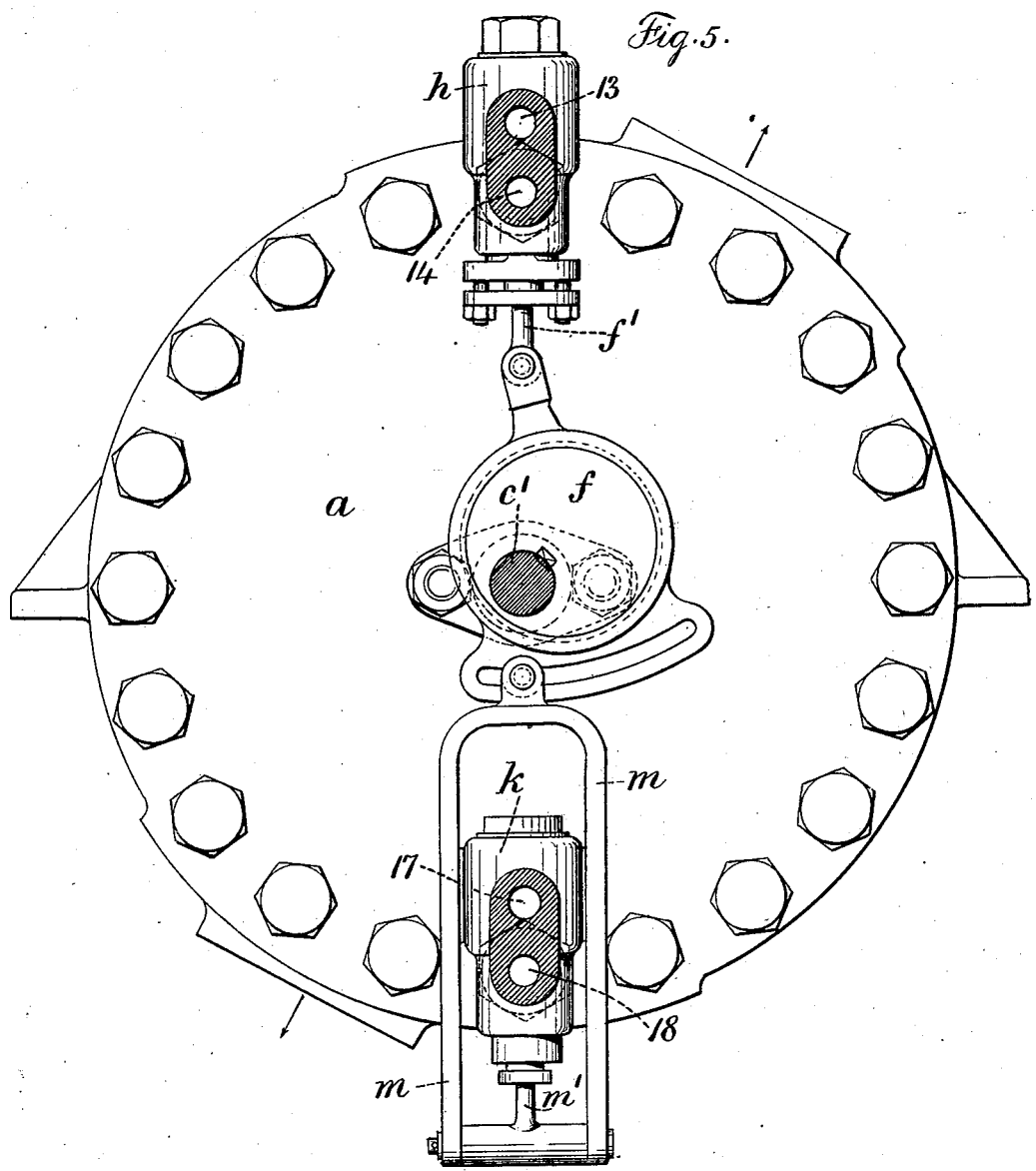

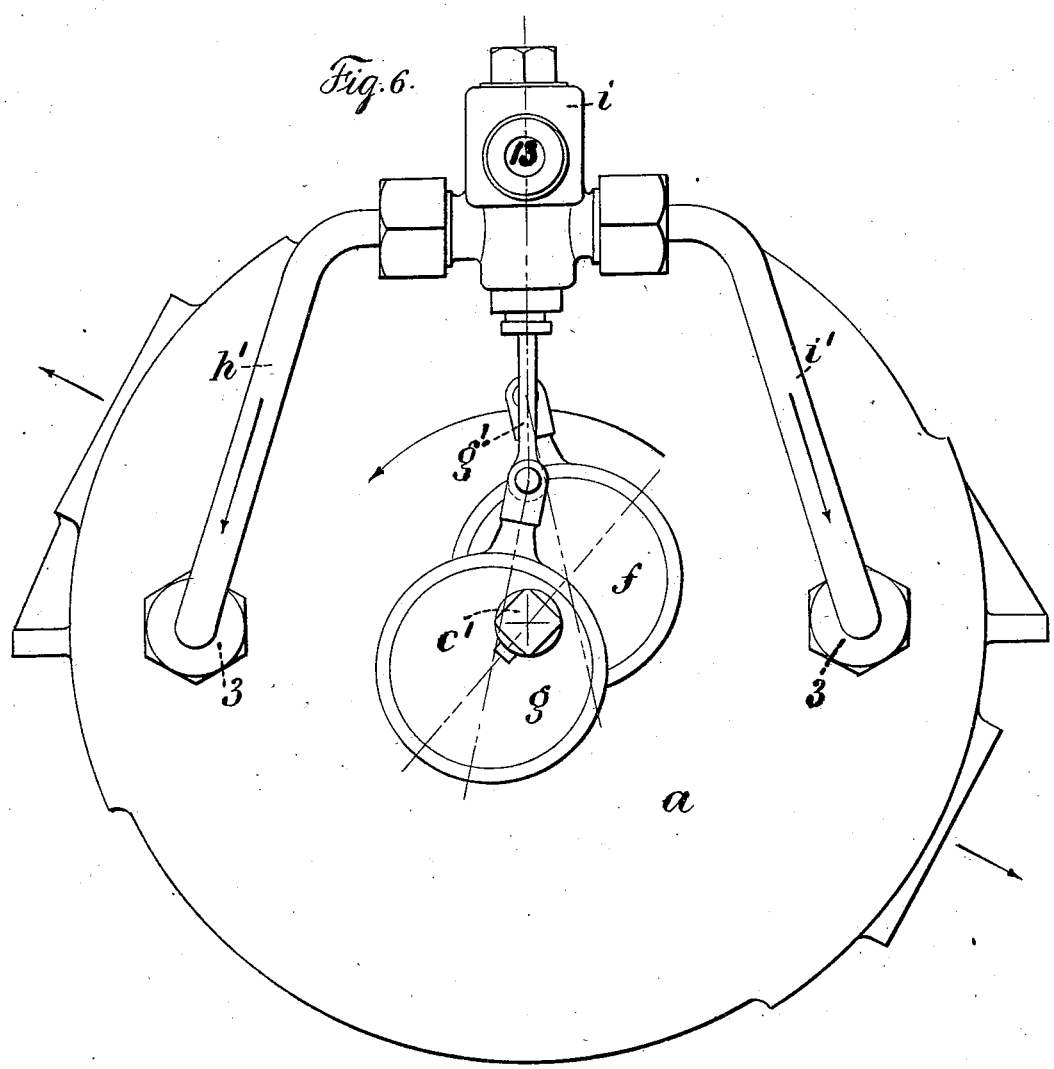

No. 728,860.

Patented May 26, 1903.

UNITED STATES PATENT OFFICE.

CESARE CAMPUS, OF NAPLES, ITALY.

MOTOR.

SPECIFICATION forming part of Letters Patent No. 728,860, dated May 26, 1903.

Application filed October 15, 1902. Serial No. 127,327. (No model.)

*To all whom it may concern:*

Be it known that I, CESARE CAMPUS, a subject of the King of Italy, residing at Naples, Italy, have invented an Improvement in Motors, of which the following is a specification.

My invention relates to a motor of the rotary type driven by fluid-pressure and applicable for driving various types of mechanisms, and said device is specially applicable for automobiles. The same is small and compact, simple and efficient. I provide a circular case with one removable side, a circular wheel within the case, and a connected power-shaft. Between the wheel and the case there are circular steamways, and the wheel is slotted transversely and preferably provided with an enlarged center, and I provide in the slots of said wheel plunger-pistons and a spring device tending to force the pistons apart, so that their respective ends may bear with force upon the inner surface of the circular case. I provide companion valves for supplying steam or other fluid under pressure, which valves are actuated by eccentrics on the shaft of the wheel. From these valves and to opposite sides of the circular case there are pipes for conveying steam or other fluid under pressure to the circular ways of the case, so as to actuate the circular wheel of the motor. The structure may comprise pipes as branches from two valves, or the pipes may extend direct at opposite sides of the case from four valves, two valves at each opposite side. In this construction the eccentrics may actuate one pair of valves to admit steam by two pipes simultaneously to opposite sides of the case with each half-revolution of the circular wheel or they may actuate two pairs of valves at opposite sides of the case to admit steam direct and simultaneously to two pipes with each half-revolution of the circular wheel. These valves are of peculiar construction and are actuated alternately, each pair being connected and provided with two passage-ways and two ball-valves, so that there are paths or ways for the steam or other fluid with the movement of either ball-valve by either eccentric structure.

Figure 1:
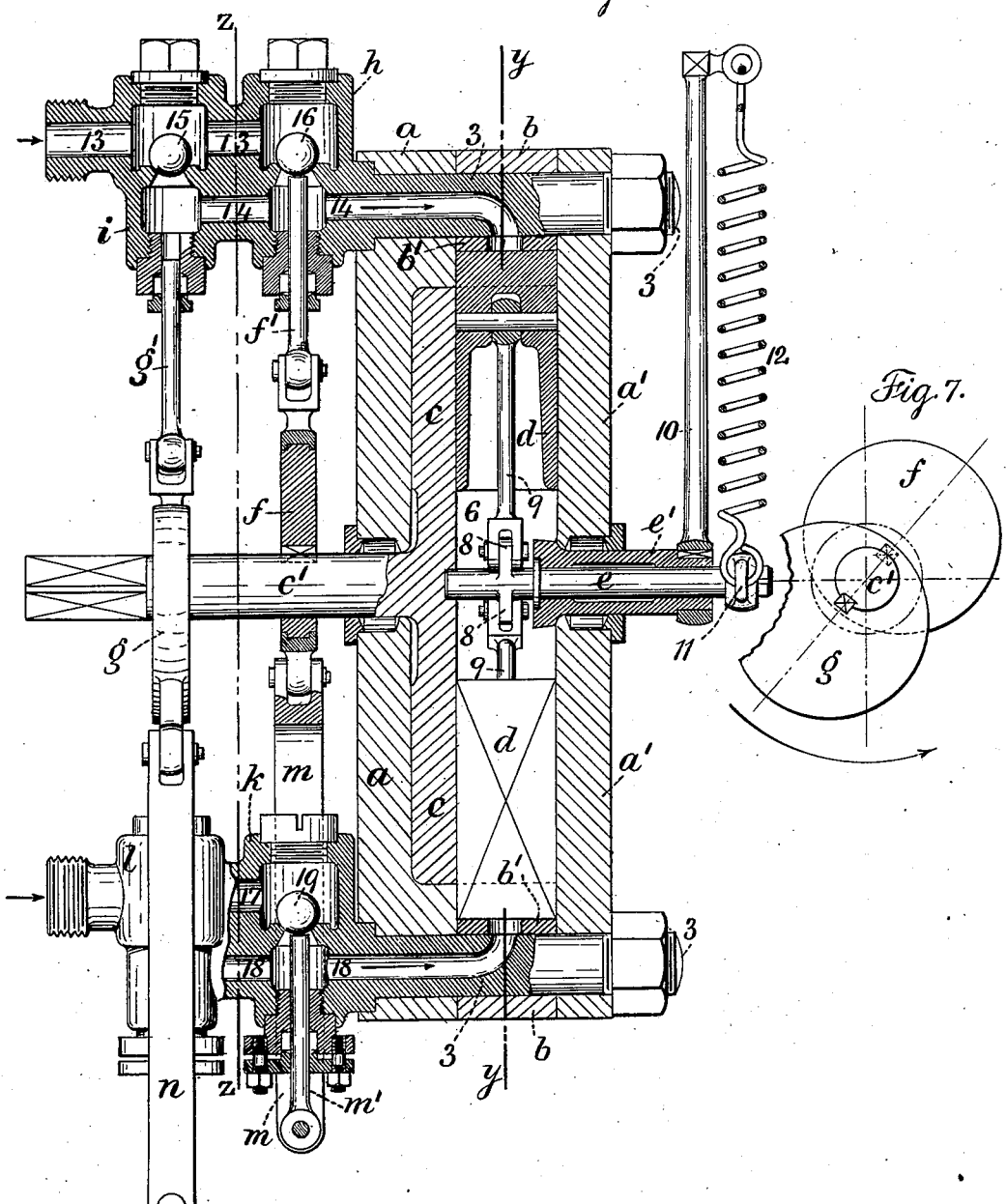
Figure 2:
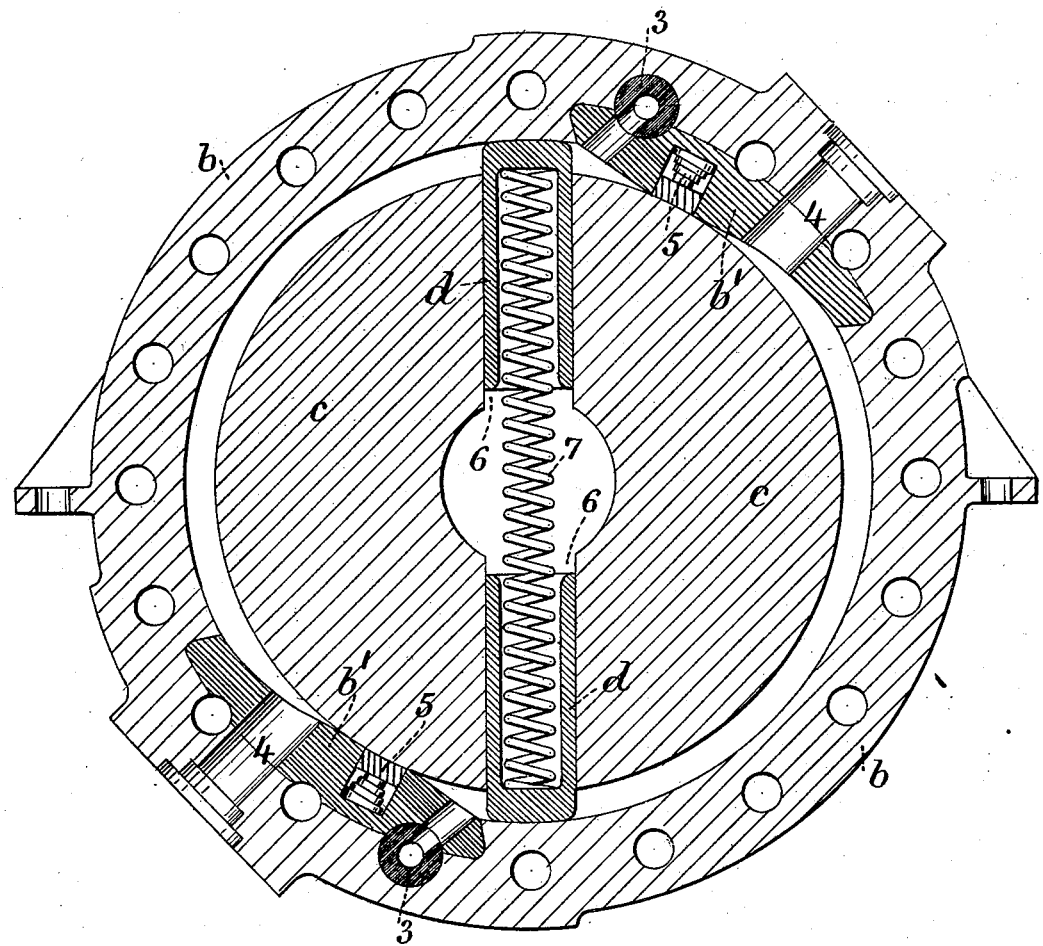
Figure 3:
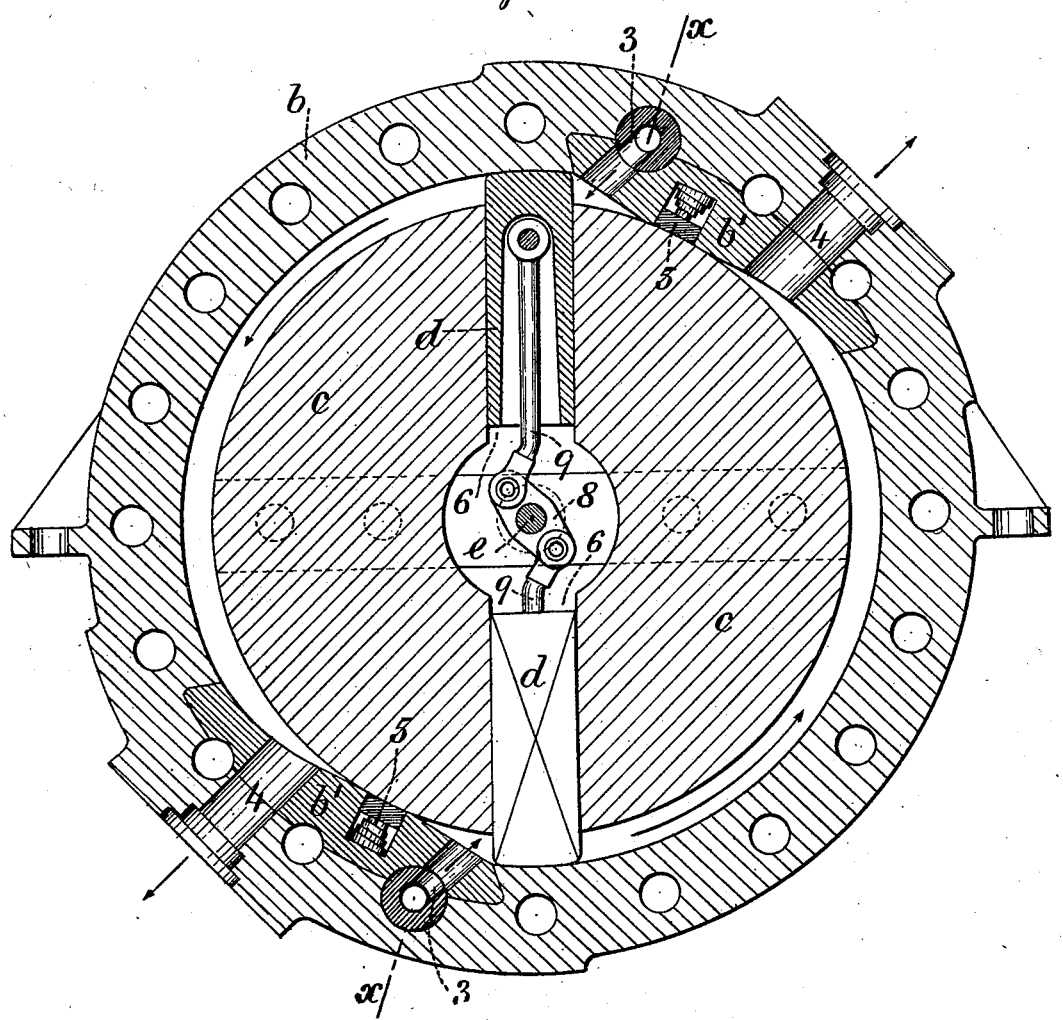
Figure 4:
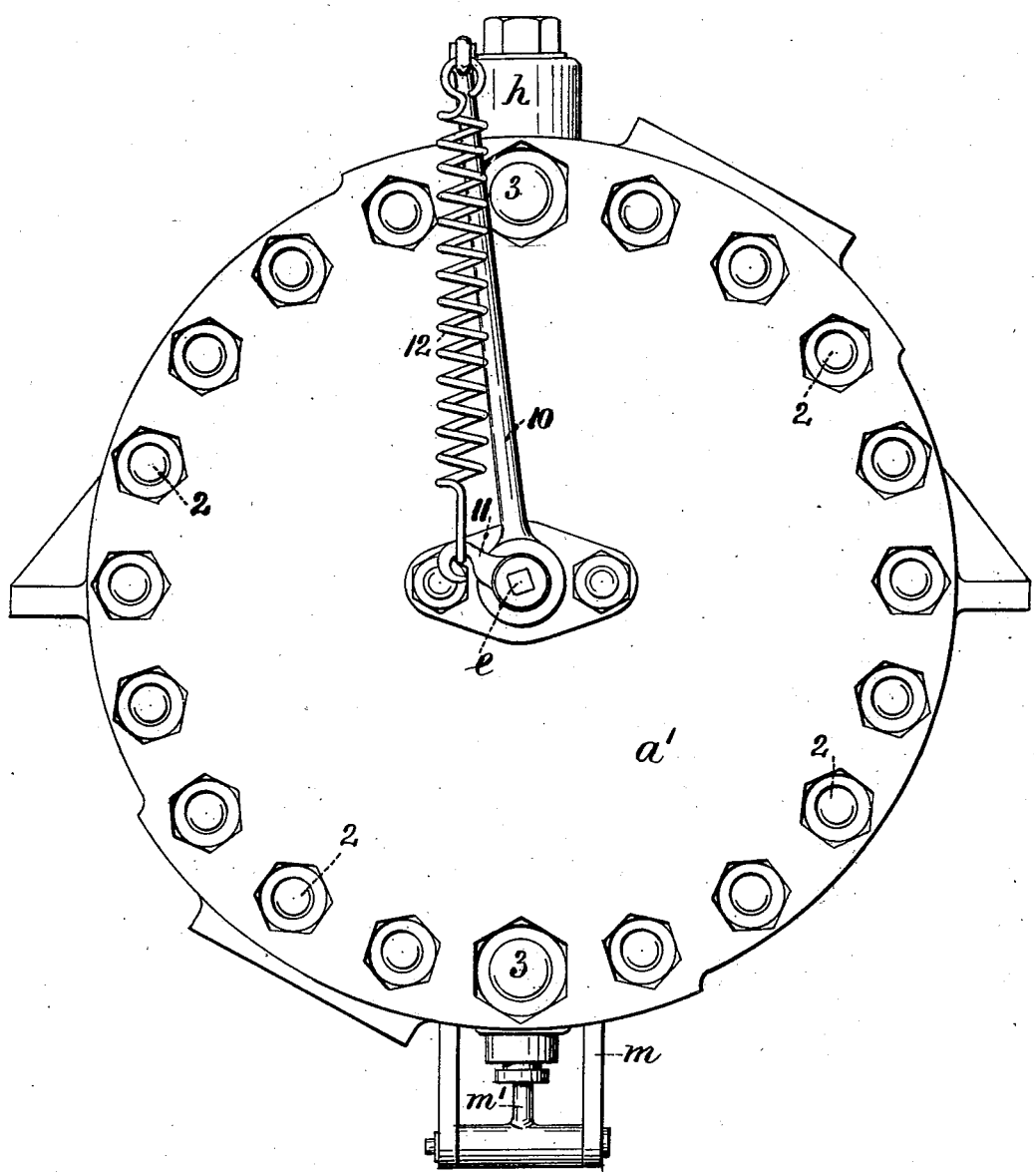

In the drawings, Figure 1 is a vertical longitudinal section and partial elevation at $x\,x$ of Fig. 3, representing my improvement. Fig. 2 is a vertical cross-section at $y\,y$ of Fig. 1, representing the simpler form of my invention. Fig. 3 is a vertical cross-section, also at $y\,y$ of Fig. 1, representing the preferred form of my invention and the exact form shown in Fig. 1. Fig. 4 is an elevation of the parts shown in Fig. 1 at the right-hand side thereof. Fig. 5 is a sectional elevation of the motor at $z\,z$ at the left-hand side, Fig. 1; and Fig. 6 is an elevation of the opposite side of the motor to that shown in Fig. 4 and illustrating a form of the invention. Fig. 7 is a diagrammatic representation of the relative positions of the eccentrics shown in Fig. 1.

The body of the motor—that is, the circular case—comprises a side $a$ of circular elevation recessed upon the inner face, a center ring $b$, agreeing in outside diameter with the part $a$, and a removable side $a'$. These parts are secured together by connecting-bolts 2, said parts being transversely perforated, as shown especially in Figs. 2 and 3, for said bolts. At opposite points of the center ring and interiorly thereof I provide septums $b'$, (see Figs. 2 and 3,) which are let into the metal of the ring $b$ and which have exposed surfaces tapering in opposite directions at each side of spring-packings 5. The portion of the septums adjacent to these steam-packings and the faces of the steam-packings bear upon the periphery of a circular wheel $c$, fitting within the center ring $b$ and into the recess of the part $a$. This circular wheel is provided with a shaft $c'$, passing through the side part $a$ and a stuffing-box formed therein, and to this shaft is connected any structure for transmitting power from the motor to a mechanism to be driven. The exhaust ways or ports 4 that are open to the atmosphere pass through the ring $b$ and through the septums $b'$, and steam-supply pipes 3 also pass through the rings $b$, and the same have coinciding apertures in the septums $b'$. In fact, the said steam-supply pipes 3 as bolt-stems are preferably made continuations of the valves hereinafter described and are provided with nuts upon their ends and perform the additional function of assisting the bolts 2 in securing the parts of the case together.

The circular wheel $c$ fits within the recess of the side $a$ of the case and extends across the open center of the ring $b$ to the inner surface of the removable side $a'$, and this wheel is transversely slotted from its face adjacent to the removable side $a'$ to a depth that agrees with the width of the center ring $b$. These slots 6 are preferably enlarged at the central portion of said wheel. Within these slots there are plunger-pistons $d$ of rectangular cross-section. The outer faces of said pistons are slightly curved to fit and coincide with the interior surface of the ring $b$, and said plunger-pistons are caused to bear with force upon the inner surface of the ring $b$ by a spring. In the simpler form of the invention, Fig. 2, this spring device is a simple expansion helical spring 7, the end thrust of which serves to force said plunger-pistons apart, with their respective ends against the inner surface of the ring.

In Figs. 1 and 3 I have shown the preferred form of spring device, which comprises the following: A rocker-arm 8 is secured to one end of an auxiliary shaft $e$. Surrounding this auxiliary shaft is a sleeve $e'$, which passes through the removable side $a'$, in which there is a stuffing-box. The inner end of the auxiliary shaft $e$ is seated in a recess in the inner face of the circular wheel $c$, and the outer end of said shaft carries a hook-arm 11. The outer end of the sleeve $e'$ carries an arm 10, extending radially and in a plane parallel with the plane of the side $a'$, and between the ends of the arms 10 11 there is a contractile helical spring 12. I provide arms 9, pivoted at one end to opposite ends of the rocker-arm 8 and at their other ends to pins passing through the plunger-pistons $d$. The action of the spring 12 is to draw the ends of the arms 10 11 together and in so doing to swing the rocker-arm 8 and impart a longitudinal separating movement to the plunger-pistons $d$, causing the same to bear with force at their outer faces upon the inner surface of the center ring $b$.

The spring-packings 5, bearing against opposite portions of the circular wheel $c$, provide a steam-tight joint, and while the plunger-pistons bear upon the inner surface of the center ring $b$ a longitudinal movement is imparted thereto to move the same into the slots 6 against the action of the spring 7 or the spring 12, when in the rotary movement of the circular wheel $c$ said plunger-pistons come into contact with the inclined faces of the septums $b'$, and as with the rotary movement of the circular wheel the ends of the pistons pass by said spring-packings and move down the reverse inclined surfaces of the septums they are again moved outward by said springs against the inner surface of the ring $b$.

On the shaft $c'$ I provide eccentrics $f$ $g$. These eccentrics have rods $f'$ $g'$ passing through packings of the valves $h$ $i$. These valves are preferably integral or connected, so as to occupy a fixed position side by side. They are provided with parallel passage-ways 13 14 for steam or other fluid under pressure and with ball-valves 15 16 on suitable seats, the passage-way 13, according to Fig. 1, being above the ball-valves and the passage-way 14 below and the latter passage-way forming a continuation of the passage-way of the steam-supply pipes 3. The eccentrics $f$ $g$, their rods $f'$ $g'$, and the valves $h$ $i$ are adapted for use in the structure shown in Figs. 1 and 5 or in the modified structure shown in Fig. 6.

The structure Fig. 6 is the simpler form of the invention, and in this there are pipes $h'$ $i'$ from opposite sides of the valves $h$ $i$ communicating with the passage-ways 13 14 and acting as conveyers for steam or other fluid under pressure to opposite points or opposite steam-supply pipes 3 of the motor-case in the structure, Figs. 1 and 5. In the structure Figs. 1 and 5 these valves $h$ $i$ are connected to and open directly by the passage-way to one side of the case only, and at the other side of the case there are valves $k$ $l$, similar in their construction to the valves $h$ $i$ and having passage-ways 17 18 and ball-valves 19, also similar to corresponding parts of the valves $h$ $i$, and these valves communicate directly with the opposite side of the motor-casing. To operate these valves by the eccentrics $f$ $g$ and simultaneously with the valves $h$ $i$, I provide yokes $m$ $n$ with roller-pin connections to slotted ways formed with the eccentrics $f$ $g$ and rods $m'$ $n'$, connected to the lower portions of said yokes and extending through packings into the valve-casings $k$ $l$.

In the operation of the motor structure the eccentrics $f$ $g$, referring to Fig. 6, may actuate one pair of valves $h$ $i$ and admit steam or other fluid under pressure by the pipes $h'$ $i'$ to the steam-supply pipes 3 at opposite sides of the motor-casing simultaneously with each half-revolution. Referring to Fig. 1, the eccentric $f$ and its rod $f'$ are about to lift the ball-valve 16 and admit the steam from the passage-way 13 to the passage-way 14 past said ball-valve. At the end of a half-revolution the eccentric $g$ and its rod $g'$ are in position to lift the ball-valve 15 and admit steam from the passage-way 13 into the passage-way 14 to act upon the plunger-pistons, it being necessary to admit steam or other fluid under pressure each half-revolution against similar faces of each plunger-piston $d$ in the position illustrated in Figs. 2 and 3. The eccentrics are so placed that the period of admission of steam or other fluid under pressure is comparatively short and the ball-valves again take their seats, and the steam or other fluid under pressure thereafter acts expansively in the steamways of the circular case in the completion of the rotary movement of the circular wheel. The exhaust at the exhaust-ways 4 is into the atmosphere. In the operation of the structure Figs. 1 and 5, where there are companion pairs of valves $h$ $i$ and $k$ $l$, the eccentric-rods $f'$ and $m'$ as oppositely placed work together to admit steam to the opposite sides of the motor-case, and with the completion of a half-revolution the piston-rods $g'$ and $n'$ act simultaneously to admit steam against the plunger-pistons at opposite sides of the motor-case.

So far as hereinbefore described and with reference to the illustrations the device is only capable of movement in one direction. A reversing mechanism forms no part of my present invention, and while a reversing mechanism *per se* will be employed in connection with this motor structure it may be of any character whatsoever and will in all probability be in the nature of a gear and clutch device between the motor and the mechanism actuated thereby—such, for instance, as the running-gear of a motor-vehicle.

I claim as my invention—

1. A motor comprising a circular casing, a circular wheel revoluble therein and having a shaft for communicating power, plunger-pistons in said circular wheel and a spring device for forcing the same apart, a double valve structure having parallel passage-ways for steam or other fluid under pressure and pipes extending therefrom to opposite portions of the motor-case, and eccentric devices for actuating said valves whereby steam is admitted to the motor-case at opposite points with each half-revolution of the circular wheel.

2. In a motor, a case comprising a side $a$ having a recessed face, a removable side $a'$, an interposed ring or annulus $b$, means for permanently connecting said parts, a circular wheel received in the recess of the part $a$ and extending transversely from the base of said recess to the inner face of the removable side $a'$, plunger-pistons in slots formed transversely across the outer face of the circular wheel, a shaft from the opposite side of said circular wheel and a spring device tending to force said pistons apart and their end faces into intimate contact with the inner surface of the center ring $b$.

3. In a motor, a case comprising a side $a$ having a recessed face, a removable side $a'$, an interposed ring or annulus $b$, means for permanently connecting said parts, a circular wheel received in the recess of the part $a$ and extending transversely from the base of said recess to the inner face of the removable side $a'$, plunger-pistons in slots formed transversely across the outer face of the circular wheel, a shaft from the opposite side of said circular wheel, supply-pipes for steam or other fluid under pressure passing through the said case and center ring at opposite points, companion valves having parallel passage-ways for supplying the steam or other fluid under pressure, and pipes connecting the same to the steam-pipes, and devices for actuating the said valves at each half-revolution of the circular wheel, and plunger-pistons.

4. In a motor, a case comprising a side $a$ having a recessed face, a removable side $a'$, an interposed ring or annulus $b$, means for permanently connecting said parts, a circular wheel received in the recess of the part $a$ and extending transversely from the base of said recess to the inner face of the removable side $a'$, plunger-pistons in slots formed transversely across the outer face of the circular wheel, a shaft from the opposite side of said circular wheel, septums $b'$ let into the interior face of the center ring at opposite points and having inclined faces from the full interior diameter of said ring in opposite directions to points of contact upon the periphery of the circular wheel so that between the periphery of the circular wheel and the interior of the center ring there are steamways of circular form, spring-packings in said septums $b'$, steam-supply pipes passing transversely through the parts $a$, $b$ of the case at opposite points and opening through said septums, there being exhaust-ways also opening through said septums and through said center ring at the other side of said spring-packings, and a spring device acting to force the pistons apart and cause their outer or end faces to bear against the inner surface of the center ring.

5. In a motor, the combination with a case of circular form, a circular wheel therein having a shaft projecting from one side, of plunger-pistons acting in opposite directions and movable in slots in the circular wheel, an auxiliary shaft axially in line with the main shaft of the circular wheel and extending through the opposite side of the motor-case, a rocker-arm on said shaft and arms pivotally connected at one end to said rocker-arm and at the other ends to the plunger-pistons, and a spring device acting to swing the auxiliary shaft and straighten the rocker-arm and the arms pivotally connected therewith to force the pistons apart, substantially as set forth.

6. In a motor, the combination with a case of circular form, a circular wheel therein having a shaft projecting from one side, of plunger-pistons acting in opposite directions and movable in slots in the circular wheel, an auxiliary shaft axially in line with the main shaft of the circular wheel and extending through the opposite side of the motor-case, a rocker-arm on said shaft and arms pivotally connected at one end to said rocker-arm and at the other ends to the plunger-pistons, a hook-arm on the end of said auxiliary shaft, a sleeve surrounding said auxiliary shaft, and an arm connected radially to said sleeve, and a helical spring connected at its respective ends to the said arms, whereby the shaft and sleeve turn together with the arms and spring and the spring exerts a contractile action to draw the arms together and through the intervention of the rocker-arm and the arms pivoted thereto to force the plunger-pistons apart, substantially as set forth.

7. In a motor, the combination with a circular case, a circular wheel and plunger-pistons carried thereby revoluble in said case, and a shaft projecting from one side of the motor-case and connected to said circular wheel, of steam-supply pipes entering said case at opposite points, pairs of valves having parallel passage-ways for steam or other fluid under pressure, and ball-valves connected to said steam-supply pipes, eccentrics upon the shaft of the circular wheel in opposite positions, rods connected with said eccentrics and passing to one pair of valves, yokes connected to said eccentrics and rods therefrom to the other pair of valves, whereby opposite ball-valves of each pair of valves are simultaneously actuated by the said eccentrics, and steam or other fluid under pressure is admitted into opposite points of the motor-case with each half-revolution of the circular wheel and plunger-pistons, substantially as set forth.

Signed by me this 9th day of October, 1902.

CESARE CAMPUS.

Witnesses:
 GEO. T. PINCKNEY,
 S. T. HAVILAND.